United States Patent [19]

Schultz et al.

[11] Patent Number: 5,299,460
[45] Date of Patent: Apr. 5, 1994

[54] PRESSURE SENSOR

[75] Inventors: Warren J. Schultz; Denise M. Williams, both of Tempe, Ariz.

[73] Assignee: Motorola, Inc., Schaumburg, Ill.

[21] Appl. No.: 840,472

[22] Filed: Feb. 24, 1992

[51] Int. Cl.⁵ ............................................... G01L 9/00
[52] U.S. Cl. ......................................... 73/753; 73/727; 324/678
[58] Field of Search ............... 73/178, 180, 181, 182, 73/183, 186, 187, 184, 753, 727, 721; 324/678, 676, 538; 328/151

[56] References Cited

U.S. PATENT DOCUMENTS 4,539,843 9/1985 Wise ........................................ 73/179

*Primary Examiner*—Donald O. Woodiel
*Attorney, Agent, or Firm*—Bradley J. Botsch, Sr.

[57] ABSTRACT

A circuit for a pulse width modulating a sensor (12) has been provided. The circuit includes a first switch (22) for alternately coupling the sensor between first and second supply voltage terminals. The circuit also includes second (24) and third (28) switches and first and second capacitors for sampling the differential voltage appearing at outputs of the sensor when the first switch is in a closed state.

6 Claims, 2 Drawing Sheets

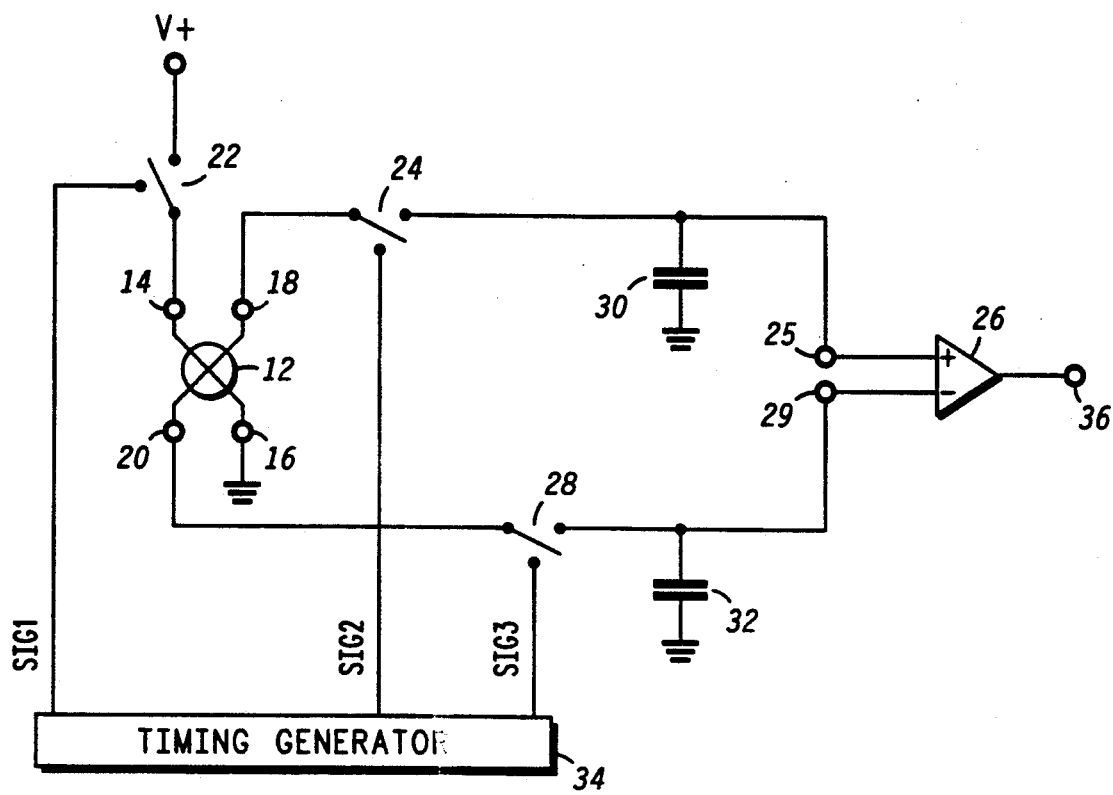
FIG. 1
FIG. 2
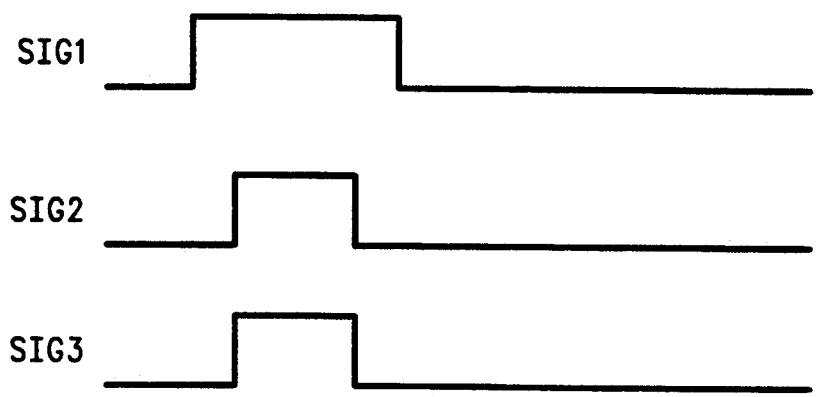

5,299,460

PRESSURE SENSOR

FIELD OF THE INVENTION

This invention relates to sensors and, more particularly, to a low current, pulse width modulated, pressure sensor.

BACKGROUND OF THE INVENTION

Pressure sensors are well known in the art for measuring the difference between pressures applied simultaneously to opposite sides of a diaphragm of the sensor to produce a differential output voltage at respective outputs. Typically, a pressure sensor is coupled between first and second power supply terminals, and provides a differential output voltage that is relative to the pressure sensed by the pressure sensor. Such a pressure sensor is the MPX2000 family of pressure sensors manufactured by Motorola, Inc.

As the voltage applied across the pressure sensor increases (via the first and second power supply terminals), the sensitivity of the pressure sensor correspondingly increases, but so does the power dissipation. Further, this power dissipation may be unacceptable for pressure sensors that are utilized in battery applications.

Hence, there exists a need for an improved pressure sensor for sensing low pressures and having reduced power dissipation.

SUMMARY OF THE INVENTION

Briefly, there is provided a circuit for pulse width modulating a sensor, the sensor having first, second, third and fourth terminals, the second terminal of the sensor being coupled to a first supply voltage terminal, the circuit comprising a pulse width modulating circuit coupled between a second supply voltage terminal and the first terminal of the sensor for alternately rendering the sensor active; and a sample and hold circuit coupled to the third and fourth terminals of the sensor for sampling the signal level appearing at the third and fourth terminals of the sensor when the pulse width modulating circuit renders the sensor active, the sample and hold circuit providing a differential output signal corresponding to a pressure sensed by the sensor.

The present invention will be better understood from the following detailed description taken in conjunction with the accompanying drawings.

BRIEF DESCRIPTION OF THE DRAWING

FIG. 1 is a partial schematic/block diagram of a circuit for pulse width modulating a sensor;

FIG. 2 is a graphical diagram illustrating various signals appearing within the circuit shown in FIG. 1;

DETAILED DESCRIPTION OF THE DRAWINGS

Figure 3:
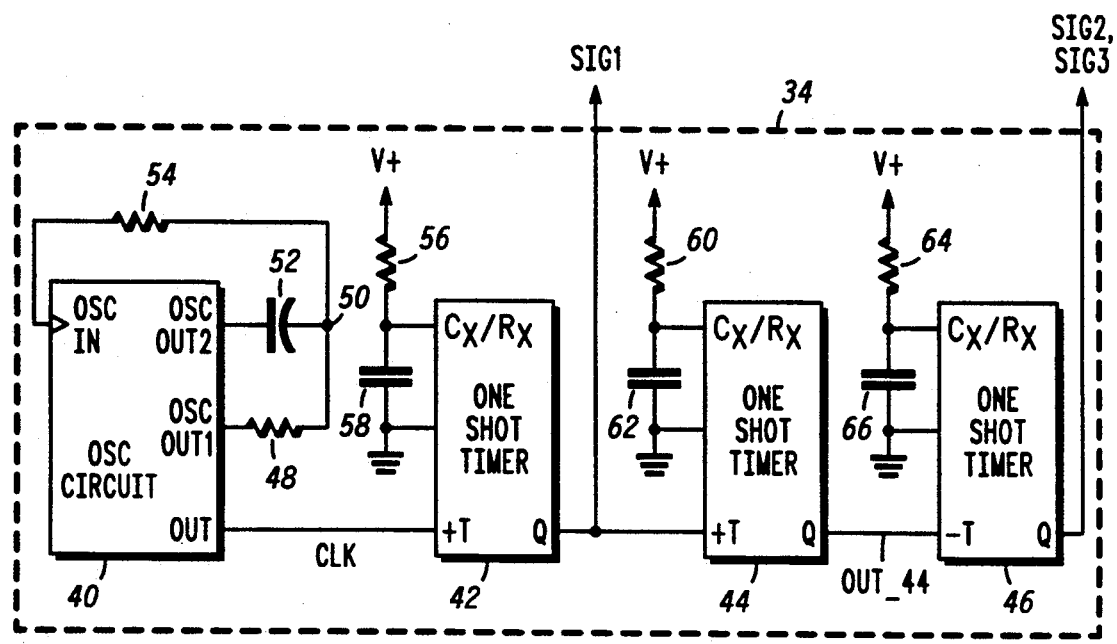
FIG. 3 is a more detailed block diagram illustrating at least one implementation of the timing circuit shown in FIG. 1.

Referring to FIG. 1, a partial schematic/block diagram of a circuit for pulse width modulating sensor 12 is shown. Sensor 12, which may be a silicon pressure sensor, includes inputs coupled to terminals 14 and 16 wherein terminal 16 is coupled to a first supply voltage terminal, for example, ground reference. Also, sensor 12 includes outputs coupled to terminals 18 and 20.

Switch 22 has a first terminal coupled to terminal 14, and a second terminal coupled to a second supply voltage terminal at which the voltage potential V+ is applied. Switch 24 has a first terminal coupled to terminal 18, and a second terminal coupled to terminal 25 wherein terminal 25 is coupled to a first input of differential amplifier 26. Switch 28 has a first input coupled to terminal 20, and a second terminal coupled to terminal 29 wherein terminal 29 is coupled to a second input of differential amplifier 26. A differential voltage appears across terminals 25 and 29 which corresponds to a pressure sensed by sensor 12.

Capacitor 30 is coupled between the second terminal of switch 24 and ground reference. Similarly, capacitor 32 is coupled between the second terminal of switch 28 and ground reference.

Timing generator 34 has a plurality of outputs for generating signals SIG1, SIG2, and SIG3 which are respectively applied to the control inputs of switches 22, 24, and 28. Also, the output of differential amplifier 26 is coupled to terminal 36.

In operation, switch 22 is used to pulse width modulate sensor 12 such that when signal SIG1 is a logic high, switch 22 is closed and sensor 12 is powered up because its inputs are now coupled between voltage V+ and ground reference. Further, after a predetermined amount of time after closing switch 22, switches 24 and 28 are then closed via signals SIG2 and SIG3 going to a logic high. When switches 24 and 28 close, capacitors 30 and 32 are allowed to charge up to the voltages respectively appearing at terminals 18 and 20 which are essentially the differential output voltage of sensor 12. In other words, switches 24, 28 and capacitors 30 and 32 function to form a sample and hold circuit for sampling the value of the differential voltage appearing at the outputs of sensor 12, and providing this voltage at terminals 25 and 29.

The differential voltage appearing across terminals 25 and 29 are then respectively applied to first and second inputs of differential amplifier 26 which provides an output at terminal 36. Differential amplifier 26 may be used to convert the differential voltage appearing across terminals 25 and 29 to a corresponding voltage within a predetermined range.

Switches 24 and 28 are then opened by pulling logic signals SIG2 and SIG3 to a logic low voltage level. Subsequently and after a predetermined amount of time, switch 22 is then opened via signal SIG1 being pulled to logic low voltage level.

The timing relationship between logic signals, SIG1, SIG2 and SIG3 are illustrated in FIG. 2. As clearly seen and aforedescribed, signals SIG2 and SIG3 transition from a logic low to a logic high and back to a logic low within the time that signal SIG1 transitions from a logic low to a logic high and back to a logic low. This ensures that switches 24 and 28 will never be closed unless switch 22 is also closed. Further, when switch 22 is open, sensor 12 is not coupled between voltage V+ and ground reference and, thus, substantially zero power is consumed. This results in a substantial power savings over the prior art. Additionally, the present invention allows voltage V+ to be increased (for increased sensor sensitivity) while having minimum power dissipation.

Referring to FIG. 3, a more detailed block diagram illustrating at least one implementation of timing circuit 34 shown in FIG. 1. Timing circuit 34 includes oscillator circuit 40 having a clock output coupled to the +T input of one shot timer 42. The output of one shot timer 42 provides signal SIG1 and is also coupled to the +T input of one shot timer 44. The output of one shot timer 44 is coupled to the −T input of one shot timer 46 where the output of one shot timer 46 provides signals SIG2 and SIG3.

Oscillator circuit 40 includes outputs OSC OUT 1 and OSC OUT 2 which can be utilized in conjunction with input OSC IN to form an on-chip reference oscillator. In particular, output OSC OUT 1 is coupled through resistor 48 to circuit node 50 while output OSC OUT 2 is coupled through capacitor 52 to circuit node 50. Further, circuit node 50 is coupled through resistor 54 to input OSC IN. The frequency of oscillation of the signal occurring at the output of oscillator circuit 40 can be adjusted by varying the values of resistor 48 and capacitor 52. One example of a part that can be used to implement the function of oscillator circuit 40 is the Motorola MC14536.

One shot timer 42 includes a $C_X/R_X$ input that is coupled through resistor 56 to operating potential V+ and through capacitor 58 and returned to ground. The output pulse width of one shot timer 42 is determined by the values of resistor 56 and capacitor 58.

Similarly, one shot timer 44 includes a $C_X/R_X$ input which is coupled through resistor 60 to operating potential V+ and through capacitor 62 and returned to ground. Also, the output pulse width of one shot timer 44 is determined by the values of external components resistor 60 and capacitor 62.

Finally, one shot timer 46 has a $C_X/R_X$ input that is coupled through resistor 64 to operating potential V+ and through capacitor 66 and returned to ground. Likewise, the output pulse width of one shot timer 46 is determined by the value of the external components resistor 64 and capacitor 66. One shot timers 42 and 44 function to provide predetermined width pulse outputs when a low to high transition occurs at its +T input. But, one shot timer 46 functions to provide a predetermined width pulse output when a high to low transition occurs at its −T input. At least one part that can be utilized to preform the function of one shot timers 42, 44 and 46 is the Motorola MC14538.

Figure 4:
FIGS. 4-8 are pictorial diagrams illustrating various signals appearing within the timer circuit shown in FIG. 3.
Figure 5:
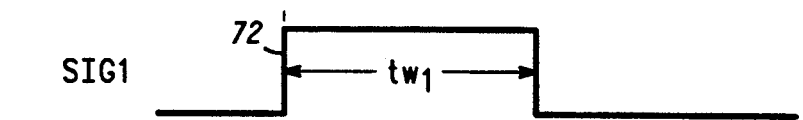
Figure 6:
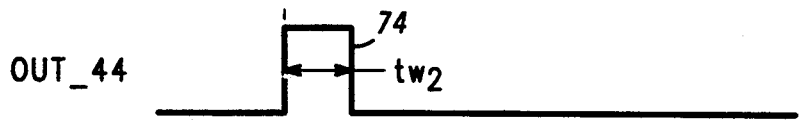
Figure 7:
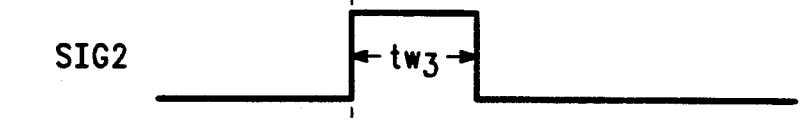
Figure 8:
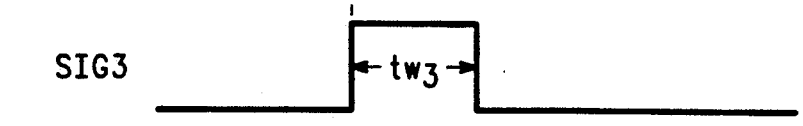

Referring to FIGS. 4–7, pictorial diagrams illustrating various signals appearing within timer circuit 34 are shown. In particular, the output of oscillator circuit 40 is shown in FIG. 4 as signal CLK. Upon a rising transition such as transition 70, one shot timer 42 is activated and provides a pulse at its output having a predetermined pulse width of $t_{W1}$ which is determined by external components resistor 56 and capacitor 58. This signal is denoted as SIG1 and shown in FIG. 5. Further, upon the rising transition of SIG1 as denoted by low to high transition 72, one shot timer 44 provides an output pulse having a predetermined pulse width of $t_{W2}$ as determined by the values of external components resistor 60 and capacitor 62. The output pulse of timer 44 is denoted as OUT_44 and is shown in FIG. 6. Finally, upon the falling transition of signal OUT_44 as denoted by high to low transition 74, one shot timer 46 will provide an output pulse having a predetermined pulse width of $t_{W3}$ as shown in FIG. 7. It should be understood that pulse width is $t_{W1}$, $t_{W2}$ and $t_{W3}$ are chosen accordingly so that the pulse width of signals SIG2 and SIG3 are within the pulse width of SIG1 as illustrated in FIGS. 5 and 7. Further, it is worth noting that the wave forms shown in FIGS. 4–7 neglect internal delays of one shot timers 42, 44 and 46.

By now it should be apparent from the forgoing discussion that a novel circuit for a pulse width modulating a sensor has been provided. The circuit includes a first switch for alternately coupling the sensor between first and second supply voltage terminals. The circuit further includes second and third switches for sampling the differential voltage appearing at outputs of the sensor when the first switch is in a closed state such that the sensor is coupled between the first and second supply voltage terminals.

While the invention has been described in conjunction with specific embodiments thereof, it is evident that many alterations, modifications and variations will be apparent to those skilled in the art in the light of the forgoing description. Accordingly, it is intended to embrace all such alterations, modifications and variations in the appended claims.

We claim:

1. A circuit for pulse width modulating a sensor, the sensor having first, second, third and fourth terminals, the second terminal of the sensor being coupled to a first supply voltage terminal, the circuit comprising:
   a pulse width modulating circuit coupled between a second supply voltage terminal and the first terminal of the sensor for alternately rendering the sensor active; and
   a sample and hold circuit coupled to the third and fourth terminals of the sensor for sampling the signal level appearing at the third and fourth terminals of the sensor when said pulse width modulating circuit renders the sensor active, said sample and hold circuit providing a differential output signal corresponding to a pressure sensed by the sensor.

2. The circuit according to claim 1 further including a differential amplifier having first and second inputs and an output, said first and second inputs of said differential amplifier being respectively coupled to receive said differential output signal of said sample and hold circuit, said output of said differential amplifier being coupled to an output of the circuit.

3. The circuit according to claim 2 wherein said pulse width modulating circuit includes:
   a first switch having first, second and control terminals, said first terminal of said first switch being coupled to the first terminal of the sensor, said second terminal of said first switch being coupled to said second supply voltage terminal, said control terminal of said first switch being coupled to receive a first control signal.

4. The circuit according to claim 3 wherein said sample and hold circuit includes:
   a second switch having first, second and control terminals, said first terminal of said second switch being coupled to the third terminal of the sensor, said control terminal of said second switch being coupled to receive a second control signal;
   a third switch having first, second and control terminals, said first terminal of said third switch being coupled to the fourth terminal of the sensor, said control terminal of said third switch being coupled to receive a third control signal;
   a first capacitor having first and second terminals, said first terminal of said first capacitor being coupled to said second terminal of said second switch, said second terminal of said first capacitor being coupled to the first supply voltage terminal; and a second capacitor having first and second terminals, said first terminal of said second capacitor being coupled to said second terminal of said third switch, said second terminal of said second capacitor being coupled to the first supply voltage terminal, said first terminals of said first and second capacitors being respectively coupled to provide the differential output signals of said sample and hold circuit.

5. A circuit for pulse width modulating a sensor, the sensor having first, second, third and fourth terminals, the second terminal of the switch being coupled to a first supply voltage terminal, the circuit comprising:

a timing circuit for providing first, second and third control signals;

a first switch having first, second and control terminals, said first terminal of said first switch being coupled to the first terminal of the sensor, said second terminal of said first switch being coupled to a second supply voltage terminal, and said control terminal of said first switch being coupled to receive said first control signal of said timing circuit;

a second switch having first, second and control terminals, said first terminal of said second switch being coupled to the third terminal of the sensor, said control terminal of said second switch being coupled to receive said second control signal of said timing circuit;

a third switch having first, second and control terminals, said first terminal of said third switch being coupled to the fourth terminal of the sensor, said control terminal of said third switch being coupled to receive said third control signal of said timing circuit;

a first capacitor having first and second terminals, said first terminal of said first capacitor being coupled to said second terminal of said second switch, said second terminal of said first capacitor being coupled to the first supply voltage terminal; and a second capacitor having first and second terminal, said first terminal of said second capacitor being coupled to said second terminal of said third switch, said second terminal of said capacitor being coupled to the first supply voltage terminal, said first terminals of said first and second capacitors being respectively coupled to first and second output terminals of the circuit for providing a differential signal corresponding to a pressure sensed by the sensor.

6. The circuit accordingly to claim 5 further including a differential amplifier having first and second inputs and an output, said first input of said differential amplifier being coupled to said first terminal of said first capacitor, said second input of said differential amplifier being coupled to said first terminal of said second capacitor, and said output of said differential amplifier being coupled to a third output terminal of the circuit.

* * * * *